(12) United States Patent
Köhler, deceased et al.

(10) Patent No.: US 6,653,324 B1
(45) Date of Patent: Nov. 25, 2003

(54) STABILIZATION OF WOOD SUBSTRATES

(75) Inventors: Manfred Köhler, deceased, late of Freiburg (DE), by Vivian Köhler, legal representative; by Inga Köhler, legal representative, Berlin (DE); by Antoin Kamran Köhler, legal representative, Freiburg (DE); Clemens Auschra, Freiburg (DE); Glen Thomas Cunkle, Stamford, CT (US); Peter Nesvadba, Marly (CH); Raymond Seltzer, New City, NY (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/069,891

(22) PCT Filed: Aug. 24, 2000

(86) PCT No.: PCT/EP00/08259

§ 371 (c)(1),
(2), (4) Date: Feb. 27, 2002

(87) PCT Pub. No.: WO01/17738

PCT Pub. Date: Mar. 15, 2001

(30) Foreign Application Priority Data

Sep. 2, 1999 (EP) ............................................ 99810785

(51) Int. Cl.$^7$ ...................... A61K 31/445; A61K 31/13; A01N 33/24; A01N 33/02
(52) U.S. Cl. ........................ 514/315; 514/317; 514/318; 514/644; 514/663
(58) Field of Search ................................ 514/315, 317, 514/318, 663, 644

(56) References Cited

U.S. PATENT DOCUMENTS

| | | | |
|---|---|---|---|
| 4,511,596 A | 4/1985 | Berner | 427/44 |
| 4,831,134 A | 5/1989 | Winter et al. | 540/524 |
| 5,171,328 A | 12/1992 | Trauth et al. | 8/402 |
| 5,516,914 A | 5/1996 | Winter et al. | 548/259 |
| 5,699,182 A | 12/1997 | Alfekri | 359/321 |

FOREIGN PATENT DOCUMENTS

| | | |
|---|---|---|
| EP | 0114784 | 8/1984 |
| EP | 0434608 | 6/1991 |
| EP | 0479075 | 4/1992 |
| EP | 0943665 | 9/1999 |
| WO | 99/05108 | 2/1999 |

OTHER PUBLICATIONS

Derwent Abstract 84–203744/33 for JP 59115805 (1984).

*Primary Examiner*—Alton N. Pryor
(74) *Attorney, Agent, or Firm*—Tyler A. Stevenson

(57) ABSTRACT

The invention relates to a method of protecting wood against light-induced degradation by treatment with an impregnation which penetrates the surface of the wood comprising a) water without an organic solvent and b) a selected sterically hindered amine N-oxyl or N-hydroxyl. A further subject is the use of a sterically hindered amine N-oxyl or N-hydroxyl for the stabilization of wood.

12 Claims, No Drawings

STABILIZATION OF WOOD SUBSTRATES

This application is a 371 of PCT/EP00/08259 filed Aug. 24, 2000.

The invention relates to a method of stabilizing wood with a water solution or emulsion of a sterically hindered amine N-oxyl or N-hydroxyl against damage by heat and light and to the use of a sterically hindered amine N-oxyl or N-hydroxyl in water for the stabilization of wood.

Surfaces of wood which are exposed to intense sunlight are damaged primarily by the UV component of sunlight. This process is even enhanced by heat due to the absorbed infrared radiation from the sun. The polymeric constituents of the wood are degraded, leading to a roughening and discoloration of the surface. Subsequently, further damage results from infestation by microorganisms, especially by fungi.

The usual method of protecting wood against damage by light without giving up the visual image of the wood surface is to coat it with a colourless varnish containing a light stabilizer, in particular a UV absorber.

Wood protective coatings which contain a UV absorber, an antioxidant and an insecticide are disclosed for example in JP-A-59/115 805.

EP-A-0 479 075 discloses sterically hindered amine stabilizers for wood stains which are substituted at the nitrogen atom by hydrogen, alkyl, allyl, hydroxymethyl, hydroxyethyl, acyl, m benzoyl or benzyl.

EP-A-943 665 discloses a wide range of sterically hindered amine N-oxyls or N-hydroxyls which are applied to the wood substrate as solutions comprising at least one organic solvent. Described are also water miscible systems which contain in addition to the organic solvent a certain amount of water and optionally a polymer binder. The document does not mention impregnating solutions which contain exclusively water.

It has now been found that selected sterically hindered amine N-oxyls or N-hydroxyls have an improved stabilizing activity against light-induced degradation if they are applied from a pure water stain or impregnation to the wood. A top coat of a conventional binder which may contain further light stabilizers may additionally be applied to the wood substrate.

The present invention provides superior weatherability to wood substrates as compared to prior art techniques. In many cases it is for example not necessary to apply an additional coating. If such a coating is applied a very thin or transparent coating is mostly sufficient. This is in many cases desirable for aesthetical reasons.

Wood is a complex polymeric material containing essentially cellulose, hemicellulose and lignin. Lignin itself is a complex mixture of high molecular weight products which are derived from conyferyl alcohol.

Particularly lignin causes discoloration and undergoes degradation upon exposure to actinic radiation. It is therefore also an object of the present invention to prevent the photochemical degradation of the lignin part of wood. In addition, preventing lignin breakdown may remove a source of nutrition for fungi and thus reduce or prevent fungal attack. Therefore reduced amounts or essentially no biocides may be used in some cases.

Accordingly, the invention relates to a method of protecting wood against light-induced degradation by treatment with an impregnation which penetrates the surface of the wood comprising
  a) water without an organic solvent and
  b) a sterically hindered amine which is selected from the compounds of formulas A to R and a; A* to R*

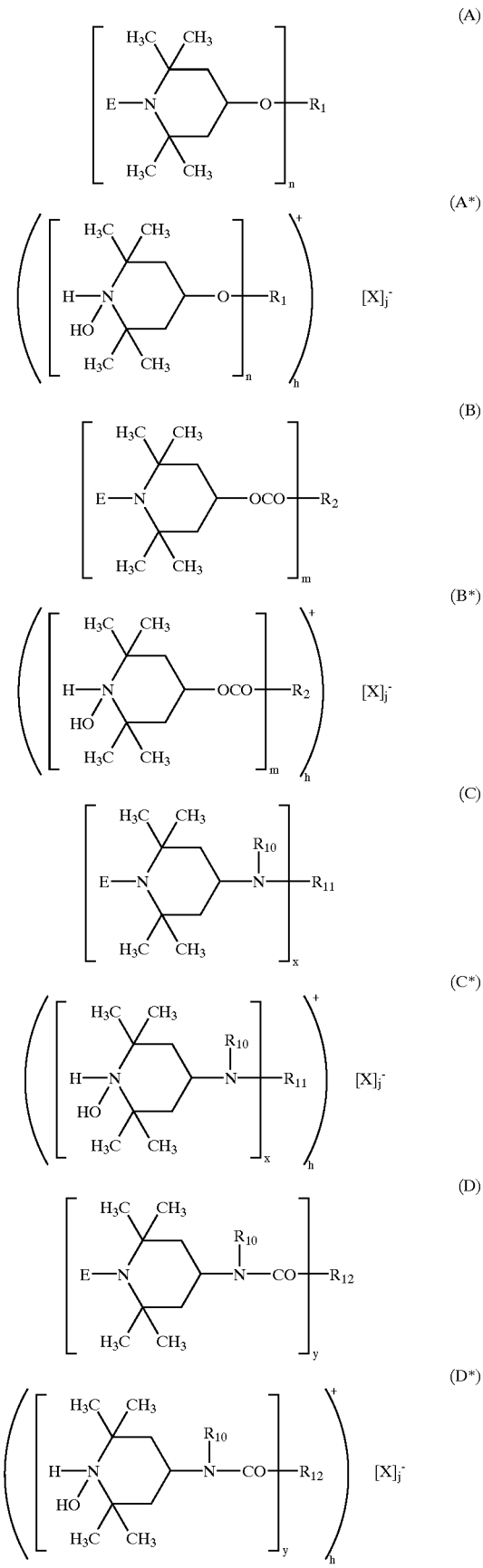

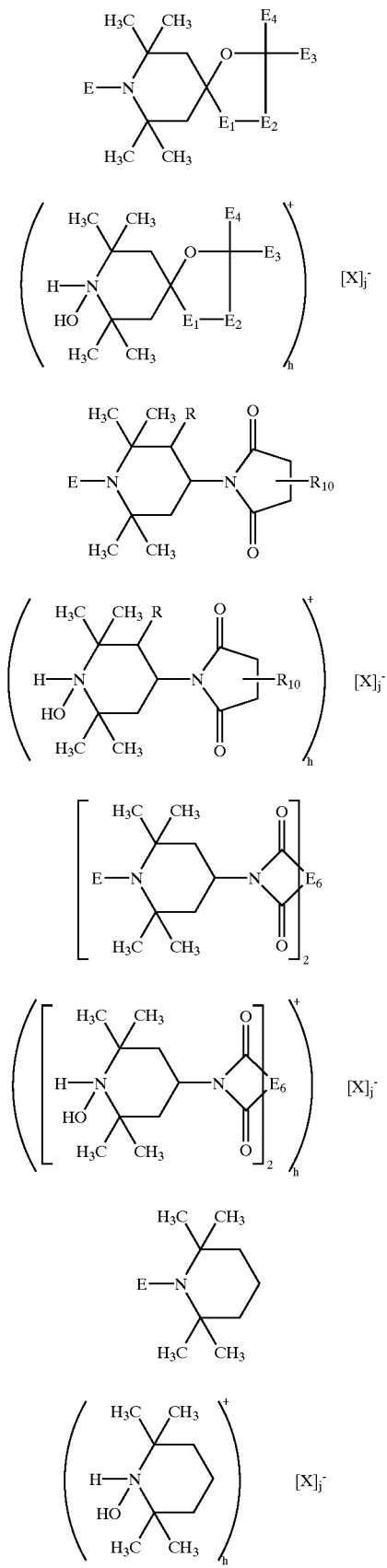

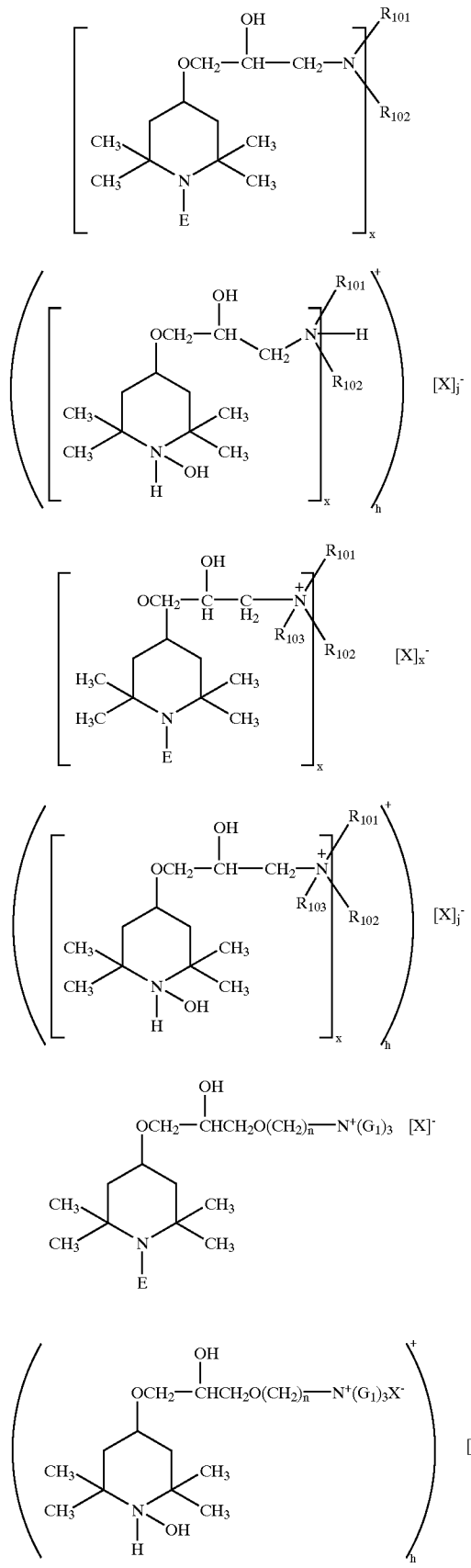
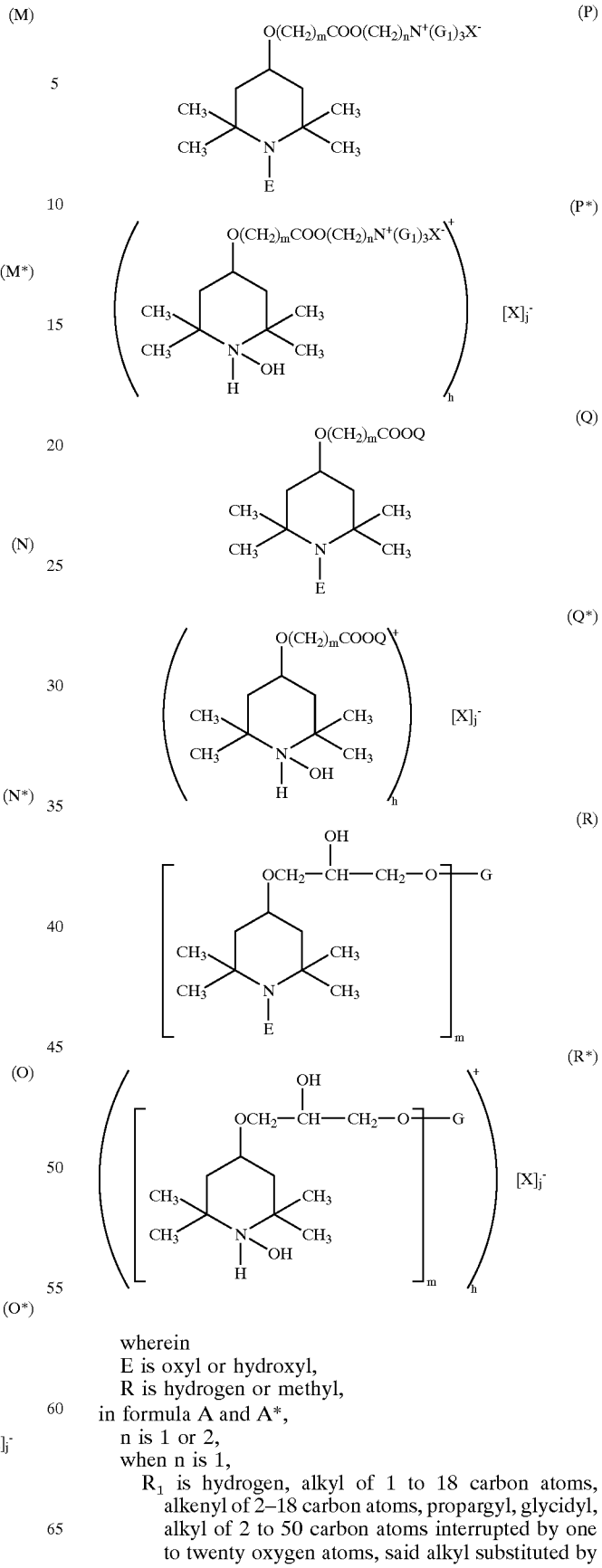
wherein
E is oxyl or hydroxyl,
R is hydrogen or methyl,
in formula A and A*,
n is 1 or 2,
when n is 1,
R₁ is hydrogen, alkyl of 1 to 18 carbon atoms, alkenyl of 2–18 carbon atoms, propargyl, glycidyl, alkyl of 2 to 50 carbon atoms interrupted by one to twenty oxygen atoms, said alkyl substituted by one to ten hydroxyl groups or both interrupted by said oxygen atoms and substituted by said hydroxyl groups, or $R_1$ is alkyl of 1 to 4 carbon atoms substituted by a carboxy group or by —COOZ where Z is hydrogen, alkyl of 1 to 4 carbon atoms or phenyl, or where Z is said alkyl substituted by —$(COO^-)_n$ $M^{n+}$ where n is 1–3 and M is a metal ion from the 1st, 2nd or 3rd group of the periodic table or is Zn, Cu, Ni or Co, or M is a group $N^{n+}(R_2)_4$ where $R_2$ is alkyl of 1 to 8 carbon atoms or benzyl, when n is 2, $R_1$ is alkylene of 1 to 12 carbon atoms, alkenylene of 4 to 12 carbon atoms, xylylene or alkylene of 1 to 50 carbon atoms interrupted by one to twenty oxygen atoms, substituted by one to ten hydroxyl groups or both interrupted by said oxygen atoms and substituted by said hydroxyl groups, in formula B and B*, m is 1 to 4, when m is 1, $R_2$ is alkyl of 1 to 18 carbon atoms, alkyl of 3 to 18 carbon atoms interrupted by —COO—, alkyl of 3 to 18 carbon atoms substituted by COOH or COO—, or $R_2$ is —$CH_2(OCH_2CH_2)_nOCH_3$ where n is 1 to 12, or $R_2$ is cycloalkyl of 5 to 12 carbon atoms, aryl of 6 to 12 carbon atoms, or said aryl substituted by one to four alkyl groups of 1 to 4 carbon atoms, or $R_2$ is —$NHR_3$ where $R_3$ is alkyl of 1 to 18 carbon atoms, cycloalkyl of 5 to 12 carbon atoms, aryl of 6 to 12 carbon atoms, or said aryl substituted by one to four alkyl of 1 to 4 carbon atoms, or $R_2$ is —$N(R_3)_2$ where $R_3$ is as defined above, when m is 2, $R_2$ is alkylene of I to 12 carbon atoms, alkenylene of 4 to 12 carbon atoms, xylylene, alkylene of 2 to 12 carbon atoms interrupted by —COO—, alkylene of 3 to 18 carbon atoms substituted by COOH or COO—, or $R_2$ is —$CH_2(OCH_2CH_2)_nOCH_2$— where n is 1 to 12, or $R_2$ is cycloalkylene of 5 to 12 carbon atoms, aralkylene of 7 to 15 carbon atoms or arylene of 6 to 12 carbon atoms, or $R_2$ is —$NHR_4NH$— where $R_4$ is alkylene of 2 to 18 carbon atoms, cycloalkylene of 5 to 12 carbon atoms, aralkylene of 8 to 15 carbon atoms or arylene of 6 to 12 carbon atoms, or $R_2$ is —$N(R_3)R_4N(R_3)$— where $R_3$ and $R_4$ are as defined above, or $R_2$ is —CO— or —NH—CO—NH—, when m is 3, $R_2$ is alkanetriyl of 3 to 8 carbon atoms or benzenetriyl, or when m is 4, $R_2$ is alkanetetrayl of 5 to 8 carbon atoms or benzenetetrayl, in formula C and C*, $R_{10}$ is hydrogen, alkyl of 1 to 18 carbon atoms, cycloalkyl of 5 to 12 carbon atoms, aralkyl of 7 to 15 carbon atoms, alkanoyl of 2 to 18 carbon atoms, alkenoyl of 3 to 5 carbon atoms or benzoyl, x is 1 or 2, when x is 1, $R_{11}$ is hydrogen, alkyl of 1 to 18 carbon atoms, alkenyl of 2 to 18 carbon atoms, propargyl, glycidyl, alkyl of 2 to 50 carbon atoms interrupted by one to twenty oxygen atoms, said alkyl substituted by one to ten hydroxyl groups or both interrupted by said oxygen atoms and substituted by said hydroxyl groups, or $R_{11}$ is alkyl of 1 to 4 carbon atoms substituted by a carboxy group or by —COOZ where Z is hydrogen, alkyl of 1 to 4 carbon atoms or phenyl, or where Z is said alkyl substituted by —$(COO^-)_n$ $M^{n+}$ where n is 1–3 and M is a metal ion from the 1st, 2nd or 3rd group of the periodic table or is Zn, Cu, Ni or Co, or M is a group $N^{n+}(R_2)_4$ where $R_2$ is hydrogen, alkyl of 1 to 8 carbon atoms or benzyl, or when x is 2, $R_{11}$ is alkylene of 1 to 12 carbon atoms, alkenylene of 4 to 12 carbon atoms, xylylene or alkylene of 1 to 50 carbon atoms interrupted by one to twenty oxygen atoms, substituted by one to ten hydroxyl groups or both interrupted by said oxygen atoms and substituted by said hydroxyl groups, in formula D and D*, $R_{10}$ is as defined above, y is 1 to 4, and $R_{12}$ is defined as $R_2$ above, in formula E and E*, $E_1$ and $E_2$, being different, each are —CO— or —$N(E_5)$— where $E_5$ is hydrogen, alkyl of 1 to 12 carbon atoms or alkoxycarbonylalkyl of 4 to 22 carbon atoms, $E_3$ is hydrogen, alkyl of 1 to 30 carbon atoms, phenyl, naphthyl, said phenyl or said naphthyl substituted by chlorine or by alkyl of 1 to 4 carbon atoms, or phenylalkyl of 7 to 12 carbon atoms, or said phenylalkyl substituted by alkyl of 1 to 4 carbon atoms, $E_4$ is hydrogen, alkyl of 1 to 30 carbon atoms, phenyl, naphthyl or phenylalkyl of 7 to 12 carbon atoms, or $E_3$ and $E_4$ together are polymethylene of 4 to 17 carbon atoms, or said polymethylene substituted by one to four alkyl of 1 to 4 carbon atoms, preferably methyl, in formula F and F*, $R_{10}$ is as defined for $R_{10}$ in formula C, in formula G and G*, $E_6$ is an aliphtic or aromatic tetravalent radical, preferably neopentanetetrayl or benzenetetrayl, in formula K and K*, $R_{51}$ is hydrogen, alkyl of 1 to 18 carbon atoms, cycloalkyl of 5 to 12 carbon atoms, or aryl of 6 to 10 carbon atoms, $R_{52}$ is hydrogen or alkyl of 1 to 18 carbon atoms, or $R_{51}$ and $R_{52}$ together of alkylene of 4 to 8 carbon atoms, f is 1 or 2, when f is 1, $R_{50}$ is as defined for $R_{11}$ in formula C when x is 1, or $R_{50}$ is —$(CH_2)_zCOOR_{54}$ where z is 1 to 4 and $R_{54}$ is hydrogen or alkyl of 1 to 18 carbon atoms, or $R_{54}$ is a metal ion from the 1st, 2nd or 3rd group of the periodic table or a group —$N(R_{55})_4$ where $R_5$ is hydrogen, alkyl of 1 to 12 carbon atoms or benzyl, when f is 2, $R_{50}$ is as defined for $R_{11}$ in formula C when x is 2, wherein in formulas M to Q and M* to Q*

$G_1$ is hydrogen, methyl, ethyl, butyl or benzyl, n is 2 to 3, m is 1 to 4, x is 1 to 4, when x is 1, $R_{101}$ and $R_{102}$ are independently alkyl of 1 to 18 carbon atoms, said alkyl interrupted by one to five oxygen atoms, said alkyl substituted by 1 to 5 hydroxyl groups or said alkyl both interrupted by said oxygen atoms and substituted by said hydroxyl groups; cycloalkyl of 5 to 12 carbon atoms, aralkyl of 7 to 15 carbon atoms, aryl of 6 to 10 carbon atoms or said aryl substituted by one to three alkyl of 1 to 8 carbon atoms, or $R_1$ is also hydrogen, or $R_{101}$ and $R_{102}$ are together tetramethyl, pentamethylene, hexamethylene or 3-oxapentamethylene, when x is 2, $R_{101}$ is hydrogen, alkyl of 1 to 8 carbon atoms, said alkyl interrupted by one or two oxygen atoms, said alkyl substituted by a hydroxyl group, or said alkyl both interrupted by one or two oxygen atoms and substituted by a hydroxyl group, $R_{102}$ is alkylene of 2 to 18 carbon atoms, said alkylene interrupted by one to five oxygen atoms, said alkylene substituted by 1 to 5 hydroxyl groups or said alkylene both interrupted by oxygen atoms and substituted by said hydroxyl groups; o-, m- or p-phenylene or said phenylene substituted by one or two alkyl of 1 to 4 carbon atoms, or $R_{102}$ is —$(CH_2)_k$O[$(CH_2)_k$O]$_h$$(CH_2)_k$— where k is 2 to 4 and h is 1 to 40, or $R_{101}$ and $R_{102}$ together with the two N atoms to which they are attached are piperazin-1,4-diyl, when x is 3, $R_{101}$ is hydrogen, $R_{102}$ is alkylene of 4 to 8 carbon atoms interrupted by one nitrogen atom, when x is 4, $R_{101}$ is hydrogen, $R_{102}$ is alkylene of 6 to 12 carbon atoms interrupted by two nitrogen atoms, $R_{103}$ is hydrogen, alkyl of 1 to 8 carbon atoms, said alkyl interrupted by one or two oxygen atoms, said alkyl substituted by a hydroxyl group, or both interrupted by one or two oxygen atoms and substituted by a hydroxyl group, and Q is an alkali metal salt, ammonium or $N^+(G_1)_4$.

and in formula R and R* m is 2 or 3, when m is 2, G is —$(CH_2CHR-O)_rCH_2CHR$—, where r is 0 to 3, and R is hydrogen or methyl, and when m is 3, G is glyceryl, X is an inorganic or organic anion, where the total charge of cations h is equal to the total charge of anions j.

Examples for X include X as phosphate, carbonate, bicarbonate, nitrate, chloride, bromide, bisulfite, sulfite, bisulfate, sulfate, borate, carboxylate, an alkylsulfonate or an arylsulfonate, or a phosphonate, like, for example, diethylenetriaminepentamethylenephosphonate. X as carboxylate especially is a carboxylate of a mono-, di-, tri- or tetracarboxylic acid, mainly of 1–18 carbon atoms, such as a formate, acetate, benzoate, citrate, oxalate, tartrate, acrylate, polyacrylate, fumarate, maleate, itaconate, glycolate, gluconate, malate, mandelate, tiglate, ascorbate, polymethacrylate, or of nitrilotriacetic acid, hydroxyethylethylenediaminetriacetic acid, ethylenediaminetetraacetic acid or diethylenetriaminepentaacetic acid.

Preferred is a method where in the compound of component (b), X is phosphate, carbonate, bicarbonate, nitrate, chloride, bromide, bisulfite, sulfite, bisulfate, sulfate, borate, carboxylate, citrate, an alkylsulfonate or an arylsulfonate, or a phosphonate.

Most preferably, X is chloride, bisulfite, bisulfate, sulfate, phosphate, nitrate, ascorbate, acetate, citrate or a carboxylate of ethylenediaminetetraacetic acid or of diethylenetriaminepentaacetic acid; most especially wherein X is bisulfate or citrate.

h and j are preferably in the range from 1–5.

Any group denoted as aryl mainly means $C_6$–$C_{12}$aryl, preferably phenyl or naphthyl, especially phenyl.

The compounds of component (b) of the invention can be pure or mixtures of compounds.

Groups denoted as alkyl are, within the definitions given, mainly $C_1$–$C_{18}$alkyl, for example methyl, ethyl, propyl such as n- or isopropyl, butyl such as n-, iso-, sec- and tert-butyl, pentyl, hexyl, heptyl, octyl, nonyl, decyl, undecyl, dodecyl, tridecyl, tetradecyl, pentadecyl, hexadecyl, heptadecyl or octadecyl.

Groups denoted as alkylene are, within the definitions given, for example methylene, 1,2-ethylene, 1,1-ethylene, 1,3-propylene, 1,2-propylene, 1,1-propylene, 2,2-propylene, 1,4-butylene, 1,3-butylene, 1,2-butylene, 1,1-butylene, 2,2-butylene, 2,3-butylene, or —$C_5H_{10}$—, —$C_6H_{12}$—, $C_7H_{14}$, —$C_8H_{16}$—, —$C_9H_{18}$—, —$C_{10}H_{20}$—, —$C_{11}H_{22}$—, —$C_{12}H_{24}$—, —$C_{13}H_{26}$—, —$C_{14}H_{28}$—, —$C_{15}H_{30}$—, —$C_{16}H_{32}$—, —$C_{17}H_{34}$—, —$C_{18}H_{36}$—.

Groups denoted as cycloalkyl or cycloalkoxy are mainly $C_5$–$C_{12}$cycloalkyl or $C_5$–$C_{12}$cycloalkoxy, the cycloalkyl part being, for example, cyclopentyl, cyclohexyl, cycloheptyl, cyclooctyl, cyclononyl, cyclodecyl, cycloundecyl or cyclododecyl. Cycloalkenyl is mainly $C_5$–$C_{12}$cycloalkenyl including cyclopentenyl, cyclohexenyl, cycloheptenyl, cyclooctenyl, cyclononenyl, cyclodecenyl, cycloundecenyl, cyclododecenyl.

Aralkyl or aralkoxy is preferably phenylalkyl or phenylalkoxy, which is alkyl or alkoxy substituted by phenyl. Examples for phenylalkyl or phenylalkoxy are, within the definitions given, benzyl, benzyloxy, a-methylbenzyl, a-methylbenzyloxy, cumyl, cumyloxy.

Residues alkenyl are mainly alkenyl of 2 to 18 carbon atoms, most preferably allyl.

Residues alkynyl are mainly alkynyl of 2 to 12 carbon atoms, preferred is propargyl.

A group denoted as acyl is mainly R(C═O)—, where R is an aliphatic or aromatic moiety.

An aliphatic or aromatic moiety, such as mentioned above or in other definitions, mainly is an aliphatic or aromatic $C_1$–$C_{30}$hydrocarbon; examples are aryl, alkyl, cycloalkyl, alkenyl, cycloalkenyl, bicycloalkyl, bicycloalkenyl, and combinations of these groups.

Examples for acyl groups are alkanoyl of 2 to 12 carbon atoms, alkenoyl of 3 to 12 carbon atoms, benzoyl.

Alkanoyl embraces, for example, formyl, acetyl, propionyl, butyryl, pentanoyl, octanoyl; X preferred is $C_2$–$C_8$alkanoyl, especially acetyl.

Residues alkenoyl are most preferably acryloyl or methacryloyl.

The alkyl groups in the different substituents may be linear or branched.

Examples for alkyl of 1 to 6 carbon atoms are methyl ethyl propyl and its isomers, butyl and its isomers pentyl and its isomers and hexyl and its isomers.

Examples for alkenyl groups with 2 to 4 carbon atoms are ethenyl, propenyl, butenyl.

Examples for alkyl groups with 1 to 4 carbon atoms interrupted by one or two oxygen atoms are —$CH_2$—O—$CH_3$, —$CH_2$—$CH_2$—O—$CH_3$, —$CH_2$—$CH_2$—O—$CH_2$—$CH_3$, —$CH_2$—O—$CH_2$—$CH_2$—O—$CH_3$ or —$CH_2$—O—$CH_2$—O—$CH_3$.

Examples for hydroxy substituted alkyl groups with 2 to 6 carbon atoms are hydroxy ethyl, di-hydroxy ethyl, hydroxy propyl, di-hydroxy propyl, hydroxy butyl, hydroxy pentyl or hydroxy hexyl.

A preferred composition contains a compound of component (b), where E is oxyl or hydroxyl and X is chloride; bisulfate, sulfate, formate, acetate, benzoate, oxalate, citrate. a carboxylate of ethylenediaminetetraacetic acid or of diethylenetriaminepentaacetic acid or polyacrylate.

More preferred is a composition where in the compound of component (b), E is oxyl or hydroxyl and X is citrate.

More preferably the compound of component (b) is selected from the compounds of formulas A, A*, B, B*, C, C*, D, D*, H, H*, I, I*, L, L*, M, M*, N and N* where E is oxyl or hydroxyl, and R is hydrogen,
in formula A and A*
  n is 1 or 2,
    when n is 1,
      $R_1$ is hydrogen, alkyl of 1 to 6 carbon atoms, alkenyl of 2–6 carbon atoms, propargyl, glycidyl, alkyl of 2 to 20 carbon atoms interrupted by one to ten oxygen atoms, said alkyl substituted by one to five hydroxyl groups or both interrupted by said oxygen atoms and substituted by said hydroxyl groups, or
      $R_1$ is alkyl of 1 to 4 carbon atoms substituted by a carboxy group or by —COOZ where Z is hydrogen or alkyl of 1 to 4 carbon atoms,
    when n is 2,
      $R_1$ is alkylene of 1 to 8 carbon atoms, alkenylene of 4 to 8 carbon atoms, alkylene of 1 to 20 carbon atoms interrupted by one to ten oxygen atoms, substituted by one to five hydroxyl groups or both interrupted by said oxygen atoms and substituted by said hydroxyl groups,
in formula B and B*
  m is 1 or 2
    when m is 1,
      $R_2$ is alkyl of 1 to 4 carbon atoms or $R_2$ is $CH_2(OCH_2CH_2)_nOCH_3$ where n is 1 to 12, or
      $R_2$ is phenyl, or said phenyl substituted by one to three methyl groups,
      $R_2$ is —$NHR_3$ where $R_3$ is alkyl of 1 to 4 carbon atoms or phenyl, or said phenyl substituted by one or two methyl groups,
    when m is 2,
      $R_2$ is alkylene of 1 to 8 carbon atoms, alkenylene of 4 to 8 carbon atoms, or $R_2$ is —$CH_2(OCH_2CH_2)_nOCH_2$— where n is 1 to 12 or,
      $R_2$ is —$NHR_4NH$— where $R_4$ is alkylene of 2 to 6 carbon atoms, aralkylene of 8 to 15 carbon atoms or arylene of 6 to 12 carbon atoms or,
      $R_2$ is —CO— or —NHCONH,
in formula C and C*,
  $R_{10}$ is hydrogen or, alkanoyl of 1 to 3 carbon atoms, is 1 or 2,
    when x is 1,
      $R_{11}$ is hydrogen, alkyl of 1 to 6 carbon atoms or glycidyl or,
      $R_{11}$ is alkyl of 1 to 4 carbon atoms substituted by a carboxy group or by COOZ where Z is hydrogen or alkyl of 1 to 4 carbon atoms,
    when x is 2,
      $R_{11}$ is alkylene of 1 to 6 carbon atoms,
in formula D and D*,
  $R_{10}$ is hydrogen,
  y is 1 or 2,
  $R_{12}$ is defined as $R_2$ above,
in formula M, M*, N and N*,
  x is 1 or 2,
    when x is 1,
      $R_{101}$ and $R_{102}$ are independently alkyl of 1 to 4 carbon atoms,
      or $R_{101}$ and $R_{102}$ are together tetramethylene, or pentamethylene,
      $R_{102}$ is hydrogen or alkyl of 1 to 4 carbon atoms, said alkyl group substituted by a hydroxyl group,
    when x is 2,
      $R_{101}$ is hydrogen, alkyl of 1 to 4 carbon atoms, said alkyl substituted by a hydroxyl group,
      $R_{102}$ is alkylene of 2 to 6 carbon atoms,
      $R_{103}$ is as defined above.

Particularly preferred is a method wherein the compound of component (b) is selected from the compounds of formulas A, A*, B, B*, C, C* and D, D*
where E is oxyl or hydroxyl,
  R is hydrogen,
in formula A and A*,
  h is 1,
  $R_1$ is hydrogen, alkyl of 1 to 4 carbon atoms, glycidyl, alkyl of 2 to 4 carbon atoms interrupted by one or two oxygen atoms, said alkyl substituted by one or two hydroxyl groups or both interrupted by said oxygen atoms and substituted by said hydroxyl groups, or
  $R_1$ is alkyl of 1 to 4 carbon atoms substituted by —COOZ where Z is hydrogen or alkyl of 1 to 4 carbon atoms,
in formula B and B*,
  m is 1 or 2,
  $R_2$ is alkyl of 1 to 4 carbon atoms or $R_2$ is $CH_2(OCH_2CH_2)_nOCH_3$ where n is 1 to 4,
    when m is 2,
      R is alkylene of 1 to 8 carbon atoms,
in formula C and C*,
  $R_{10}$ is hydrogen or alkanoyl of 1 or 2 carbon atoms,
  x is 1 or 2,
    when x is 1,
      $R_{11}$ is hydrogen, alkyl of 1 to 4 carbon atoms or glycidyl,
      $R_{11}$ is alkyl of 1 to 4 carbon atoms substituted by COOZ where Z is hydrogen or alkyl of 1 to 4 carbon atoms,
    when x is 2,
      $R_{11}$ is alkylene of 1 to 6 carbon atoms,
in formula D and D*,
  $R_{10}$ is hydrogen,
  y is 1 or 2,
  $R_{12}$ is defined as $R_2$ above.

More particularly, the hindered amine compound is
(a) bis(1-hydroxy-2,2-6-6-tetramethylpiperidin-4-yl) sebacate;
(b) 1-hydroxy-2,2-6-6-tetramethyl-4acetoxypiperidinium citrate;
(c) 1-oxyl-2,2,6,6-tetramethyl-4-acetamidopiperidine;
(d) 1-hydroxy-2,2,6,6-tetramethyl-4-acetamidopiperidine;
(e) 1-hydroxy-2,2,6,6-tetramethyl-4-acetamidopiperidinium bisulfate;
(f) 1-oxyl-2,2,6,6-tetramethyl-4-oxo-piperidine;
(g) 1-hydroxy-2,2,6,6-tetramethyl-4-oxo-piperidine;
(h) 1-hydroxy-2,2,6,6-tetramethyl-4-oxo-piperidinium acetate;

(i) 1-oxyl-2,2,6,6-tetramethyl-4methoxy-piperidine;
(j) 1-hydroxy-2,2,6,6-tetramethyl-4-methoxy-piperidine;
(k) 1-hydroxy-2,2,6,6-tetramethyl-4-methoxy-piperidinium acetate;
(l) 1-oxyl-2,2,6,6-tetramethyl-4acetoxypiperidine;
(m) 1-hydroxy-2,2,6,6-tetramethyl-4-acetoxypiperidine;
(n) 1-oxyl-2,2,6,6-tetramethyl-4-propoxy-piperidine;
(o) 1-hydroxy-2,2,6,6-tetramethyl-4-propoxy-piperidinium acetate;
(p) 1-hydroxy-2,2,6,6-tetramethyl-4-propoxy-piperidine;
(q) 1-oxyl-2,2,6,6-tetramethyl-4-(2-hydroxy-4-oxapentoxy)piperidine;
(r) 1-hydroxy-2,2,6,6-tetramethyl-4-(2-hydroxy-4-oxapentoxy)piperidinium acetate;
(s) 1-oxyl-2,2,6,6-tetramethyl-4-hydroxypiperidine;
(t) 1-hydroxy-2,2,6,6-tetramethyl-4-hydroxypiperidine;
(u) 1-hydroxy-2,2,6,6-tetramethyl-4-hydroxypiperidinium chloride;
(v) 1-hydroxy-2,2,6,6-tetramethyl-4-hydroxypiperidinium acetate;
(w) 1-hydroxy-2,2,6,6-tetramethyl-4-hydroxypiperidinium bisulfate;
(x) 1-hydroxy-2,2,6,6-tetramethyl-4-hydroxypiperidinium citrate;
(y) bis(1-hydroxy-2,2,6,6-tetramethyl-4hydroxypiperidinium)citrate;
(z) tris(1-hydroxy-2,2,6,6-tetramethyl-4hydroxypiperidinium)citrate;
(bb) tetra(1-hydroxy-2,2,6,6-tetramethyl-4hydroxypiperidinium)ethylenediaminetetraacetate;
(cc) tetra(1-hydroxy-2,2,6,6-tetramethyl-4-acetamidopiperidinium)ethylenediaminetetraacetate;
(dd) tetra(1-hydroxy-2,2,6,6-tetramethyl-4-oxopiperidinium)ethylenediaminetetraacetate;
(ee) penta(1-hydroxy-2,2,6,6-tetramethyl-4hydroxypiperidinium)diethylenetriaminepentaacetate;
(ff) penta(1-hydroxy-2,2,6,6-tetramethyl-4acetamidopiperidinium)diethylenetriaminepentaacetate;
(gg) penta(1-hydroxy-2,2,6,6-tetramethyl-4oxopiperidinium)diethylenetriaminepentaacetate;
(hh) tri(1-hydroxy-2,2,6,6-tetramethyl-4-hydroxypiperidinium)nitrilotriacetate;
(ii) tri(1-hydroxy-2,2,6,6-tetramethyl-4-acetamidopiperidinium)nitrilotriacetate;
(jj) tri(1-hydroxy-2,2,6,6-tetramethyl-4-oxopiperidinium) nitrilotriacetate;
(kk) penta(1-hydroxy-2,2,6,6-tetramethyl-4-hydroxypiperidinium)diethylenetriaminepentamethylenephosphonate;
(ll) penta(1-hydroxy-2,2,6,6-tetramethyl-4-acetamidopiperidinium)diethylenetriaminepentamethylenephosphonate;
(mm) penta(1-hydroxy-2,2,6,6-tetramethyl-4-oxopiperidinium)diethylenetriaminepentamethylenephosphonate. Also suitable are the compounds of following structural formulas:

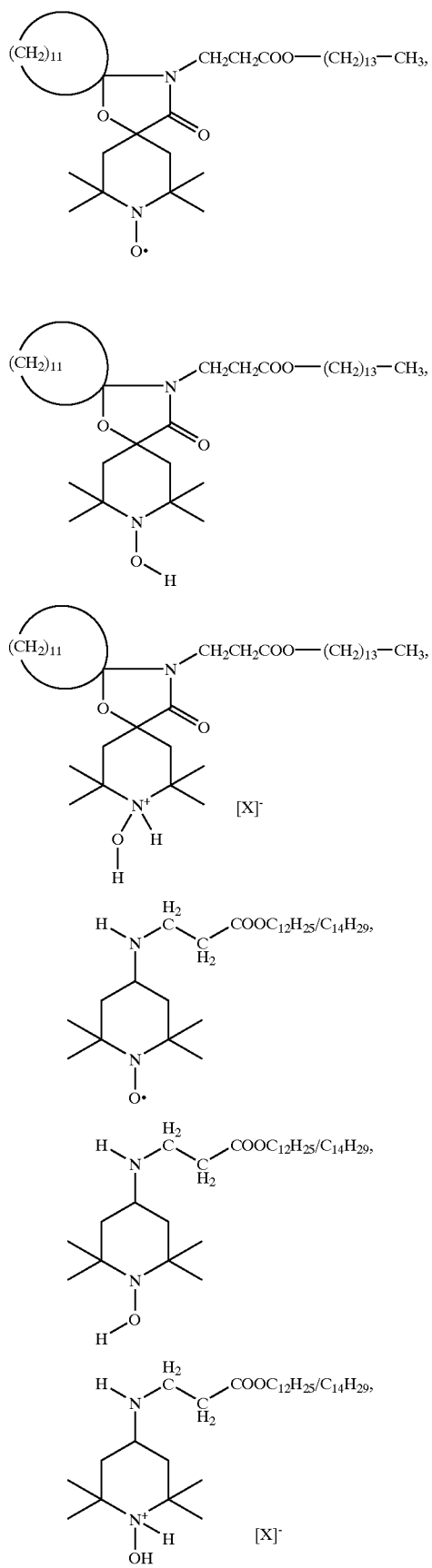

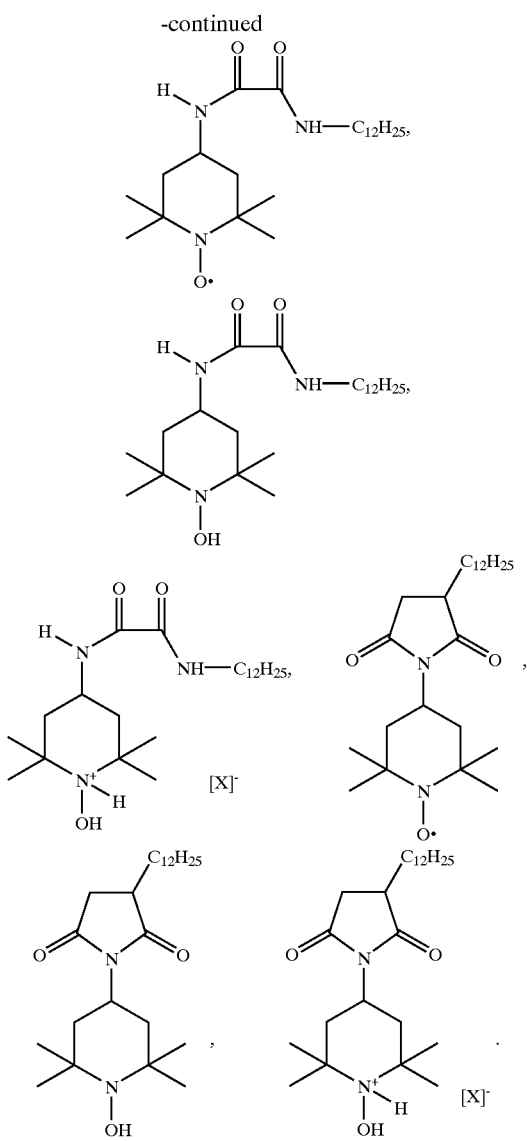

Most especially, the hindered amine compound is
(a) 1-oxyl-2,2,6,6-tetramethyl-4-hydroxypiperidine;
(b) 1-hydroxy-2,2,6,6-tetramethyl-4-hydroxypiperidine;
(c) 1-hydroxy-2,2-6-6-tetramethyl-4-acetoxypiperidinium citrate;
(d) 1-hydroxy-2,2,6,6-tetramethyl-4-hydroxypiperidinium citrate;
(e) bis(1-hydroxy-2,2,6,6-tetramethyl-4-hydroxypiperidinium)citrate;
(f) tris(1-hydroxy-2,2,6,6-tetramethyl-4-hydroxypiperidinium)citrate.

As stated above the impregnating system is 100% water based. The compounds of component b) are therefore preferably liquid and may form an emulsion, if necessary together with a surfactant to stabilize the emulsion. Suitable surfactants are known in the art and may be of cationic, anionic or non ionic type. They are commercially available and widely used in the ink and paint industry.

More preferably the compounds of component b) are water soluble. Water soluble in the sense of the present invention means that they are at room temperature soluble at least 0.1% by weight based on the amount of water, more preferably at least 1% and most preferably at least 5%.

The impregnation shall penetrate the surface of the wood, and should therefore be of relatively low viscosity. In the simplest case, the impregnation is a solution of the hindered amine in water. The impregnation may also contain a binder conventionally used for protective wood coatings.

The hindered amine compound b) is preferably present in an amount of 0.1–10%, more preferred 0.2–5% and most preferred 0.2–2% by weight based on the weight of component a).

In a further embodiment of the invention the impregnation contains additionally a polymeric binder material.

Preferably the binder is selected from the group consisting of alkyd resins, modified alkyd resins, autocrosslinking or non-autocrosslinking acrylic resins, polyester resins, drying oils, phenolic resins, nitrocellulose or mixtures thereof. It is essential that the binder is compatible with the water system. Out of the above preferred binders those are especially preferred which are water based, such as water based alkyd resins, polyesters or acrylates.

Preferably the binder is present in an amount of 1–20% by weight based on the weight of component a).

The hindered amine compounds b) are known and partially commercially available or may be produced by chemical standard methods. Examples are given in J. Polym Sci. Polym. Chem. Ed., 22, 277–281 (1984) and in U.S. Pat. No. 4,831,134. The salts are readiliy prepared from the corresponding amine precursor and a suitable acid.

The intermediates needed to make the instant compounds are largely items of commerce.

In a further preferred embodiment of the present invention an additional stabilizer selected from the group consisting of a sterically hindered phenol, a phosphite or phosphonite or mixtures thereof is used.

Examples of sterically hindered phenols, useful as antioxidants are given below.

1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(a-methylcyclohexyl)-4,6-dimethylphenol, 2,6-dioctadecyl-4-methylphenol, 2,4,6-tri cyclohexylphenol, 2,6-di-tert-butyl-4-methoxymethylphenol, 2,6-di-nonyl-4-methyl-phenol.

2. Alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxy phenol.

3. Hydroxylated thiodiphenyl ethers, for example 2,2'-thiobis(6-tert-butyl-4-methyl phenol), 2,2'-thiobis(4-octylphenol), 4,4'-thiobis(6-tert-butyl-3-methylphenol), 4,4'-thiobis(6-tert-butyl-2-methylphenol).

4. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(a-methyl cyclohexyl)phenol], 2,2'-methylenebis(4-methyl-6-cyclohexylphenol), 2,2'-methylene bis(6-nonyl-4-methylphenol), 2,2'-methylenebis(4,6-di-tert-butylphenol), 2,2'-ethylidene bis(4,6-di-tert-butylphenol), 2,2'-ethylidenebis(6-tert-butyl-4-isobutylphenol), 2,2'-methylenebis[6-(a-methylbenzyl)-4-nonylphenol], 2,2'-methylenebis[6-(a,a-dimethyl benzyl)-4-nonylphenol], 4,4'-methylenebis(2,6-di-tert-butylphenol), 4,4'-methylene bis (6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n- dodecylmercaptobutane, ethylene glycol bis[3,3-bis(3'-tert-butyl-4'-hydroxy phenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4methylphenyl]terephthalate.

5. Benzyl compounds, for example 1,3,5-tris(3,5-di-tert-butyl-4-hydroxybenzyl)-2,4,6-trimethylbenzene, bis(3,5-di-tert-butyl-4-hydroxybenzyl)sulfide, isooctyl 3,5-di-tert-butyl-4-hydroxybenzylmercaptoacetate, bis(4-tert-butyl-3-hydroxy-2,6-dimethylbenzyl)dithiolterephthalate, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, dioctadecyl 3,5-di-tert-butyl-4-hydroxybenzylphosphonate, calcium salt of monoethyl 3,5-di-tert-butyl-4-hydroxybenzylphosphonate, 1,3,5-tris(3,5-dicyclohexyl-4-hydroxybenzyl)isocyanurate.

6. Acylaminophenols, for example 4-hydroxylauranilide, 4-hydroxystearanilide, 2,4-bis(octylmercapto)-6-(3,5-di-tert-butyl-4-hydroxyanilino)-s-triazine, octyl N-(3,5-di-tert-butyl-4hydroxyphenyl)carbamate.

7. Esters of β-(3,5-di-tert-butyl-4-hydroxyohenyl) propionic acid with mono- or polyhydric alcohols, e.g. with methanol, octadecanol, 1,6-hexanediol, neopentyl glycol, triethylene glycol, pentaerythritol, tris(hydroxyethyl) isocyanurate, thiodiethylene glycol, N,N'-bis(hydroxyethyl) oxalodiamide.

8. Esters of β-(5-tert-butyl-4-hydroxy-3-methylphenyl) propionic acid with mono- or polyhydric alcohols, e.g. with methanol, diethylene glycol, octadecanol, triethylene glycol, 1,6-hexanediol, pentaerythritol, neopentyl glycol, tris (hydroxyethyl) isocyanurate, thiodiethylene glycol, N,N'-bis (hydroxyethyl)oxalodiamide.

9. Esters of β-(3,5-dicyclohexyl-4-hydroxyphenyl) propionic acid with mono- or polyhydric alcohols, e.g. with methanol, diethylene glycol, octadecanol, triethylene glycol, 1,6-hexanediol, pentaerythritol, neopentyl glycol, tris (hydroxyethyl) isocyanurate, thiodiethylene glycol, N,N'-bis (hydroxyethyl)oxalodiamide.

10. Amides of β-(3,5-di-tert-butyl-4-hydroxyphenyl) prorionic acid e.g. N,N'-bis(3,5-di-tert-butyl-4-hydroxyphenylpropionyl)hexamethylenediamine, N,N'-bis (3,5-di-tert-butyl-4-hydroxyphenylpropionyl) trimethylenediamine, N,N'-bis(3,5-di-tert-butyl-4-hydroxyphenylpropionyl)hydrazine.

In specific cases it may be advantageous to use two or more antioxidants.

Examples of useful phosphites, or phosphonites are: triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 2,2',2"-nitrilo[triethyltris(3,3',5,5'-tetra-tert-butyl-1,1'-biphenyl-2,2'-diyl)phosphite], 2-ethylhexyl(3,3', 5,5'-tetra-tert-butyl-1,1'-biphenyl-2,2'-diyl)phosphite.

Especially preferred are the following phosphites:

Tris(2,4-di-tert-butylphenyl) phosphite (Irgafos® 168, Cibaeigy), tris(nonylphenyl)phosphite, (A)
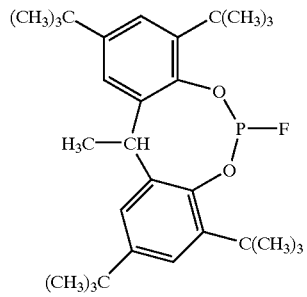

(B)
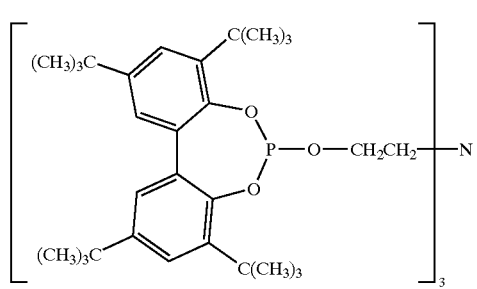

(C)
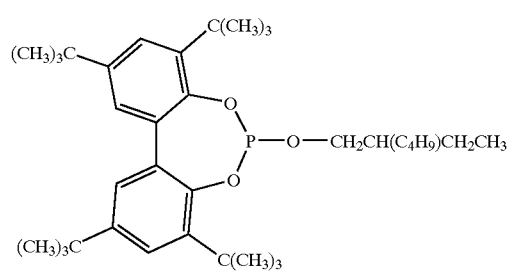

(D)
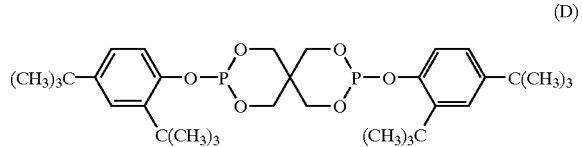

(E)
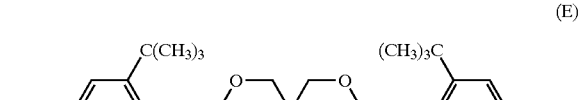

(F)
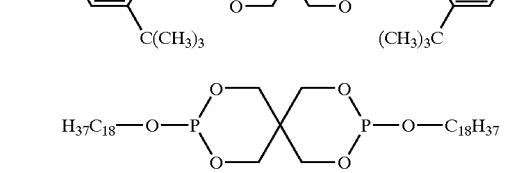

(G)
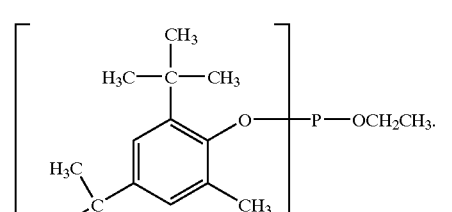

The sterically hindered phenols, phosphites or phosphonites are preferably present in an amount of 0.01%–5% by weight based on the total formulation.

The stain or impregnation may also contain preservatives such as fungicides or insecticides. Exemplary of useful fungicides are tributyltin oxide, phenylmercury salts, copper naphthenate, 1-chloronaphthalene or pentachlorophenol. Exemplary of useful insecticides are DDT, dieldrin, lindane, azaconazol, cypermethin, benzalkoniumhydrochloride, propiconazol or parathion.

Further ingredients which may be present in the stain or impregnation are minor amounts of accelerators (hardeners) for the binders, dyes or pigments, penetration aids and surface active ingredients.

The stain or impregnation can be applied to the wood by conventional techniques, for example by impregnating, spreading, brushing, dipping, deluging or spraying. Also impregnating under high pressure or under vacuum is possible.

In one preferred embodiment of the present invention an additional top coat is applied to the wood.

Any coating composition suitable for coating wood may be used as additional top coat. It will normally contain a binder, dissolved or dispersed in an organic solvent or in water or a mixture of water and solvent. The binder may typically be a surface coating resin which dries in the air or hardens at room temperature. Exemplary of such binders are nitrocellulose, polyvinyl acetate, polyvinyl chloride, unsaturated polyester resins, polyacrylates, polyurethanes, epoxy resins, phenolic resins, and especially alkyd resins. The binder may also be a mixture of different surface coating resins. Provided the binders are curable binders, they are normally used together with the hardener and/or accelerator.

Typical examples of organic solvents which may suitably be used for the coating compositions are aliphatic, aromatic or cycloaliphatic hydrocarbons, alcohols, esters, ketones or chlorinated hydrocarbons.

Water/solvent mixtures are typically mixtures of water and lower alcohols, glycols or glycol ethers.

The top coat may also be a radiation-curable, solvent-free formulation of photopolymerisable compounds. Illustrative examples are mixtures of acrylates or methacrylates, unsaturated polyester/styrene mixtures or mixtures of other ethylenically unsaturated monomers or oligomers.

The top coat may contain a soluble dye and/or a pigment and/or a filler. The pigment may be an organic, inorganic or metallic pigment. The pigments may be opaque or transparent such as for example transparent iron oxides. The filler may be typically kaolin, calcium carbonate or aluminium silicate. Preferably the top coat is a clear varnish, i.e. it contains no undissolved components.

Although the stain or impregnation contains the sterically hindered amine of formula (I) and affords good protection against light, it may be advantageous to add the sterically hindered amine of formula (I) and/or other conventional light stabilizers to the top coat. Illustrative examples of suitable conventional light stabilizers are the following compounds:

UV Absorbers and Light Stabilisers 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(a,a-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylene-bis-[4(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$] where R=3'-tert-butyl-4'-hydroxy-5'-2H-benzotriazol-2-ylphenyl, 2-[2'-hydroxy-3'-(a,a-dimethylbenzyl)-5'-(1,1,3,3-tetramethylbutyl)-phenyl] benzotriazole; 2-[2'-hydroxy-3'-(1,1,3,3-tetramethylbutyl)-5'-(a,a-dimethylbenzyl)-phenyl]benzotriazole.

2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy4,4'-dimethoxy derivatives.

Esters of substituted and unsubstituted benzoic acids, as for example 4-tertbutyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

Acrylates, for example ethyl a-cyano-b,b-diphenylacrylate, isooctyl a-cyano-b,b-diphenylacrylate, methyl a-carbomethoxycinnamate, methyl a-cyano-b-methyl-p-methoxy-cinnamate, butyl a-cyano-b-methyl-p-methoxy-cinnamate, methyl a-carbomethoxy-p-methoxycinnamate and N-(b-carbomethoxy-b-cyanovinyl)-2-methylindoline.

Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyidithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy4-methylphenyl undecylketoxime, nickel complexes of 1-phenyl-4-lauroyl-5-hydroxypyrazole, with or without additional ligands.

Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4hydroxypiperidine and succinic acid, linear or cyclic condensates of N,N'-bis (2,2,6,6-tetramethyl-4-piperidyl)hexamethylenediamine and 4-tert-octylamino-2,6-dichloro-1,3,5-triazine, tris(2,2,6,6- tetramethyl 4piperidyl)nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpipedyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-te-tramethylpiperidine (CAS Reg. No. [136504-96-6]); N-(2,2,6,6-tetramethyl-4-piperidyl)-n-do-decylsuccinimid, N-(1,2,2,6,6-pentamethyl-4-piperidyl)-n-dodecylsuccinimid, 2-undecyl-7,7,9,9-tetramethyl-1-oxa-3,8-diaza4-oxo-spiro[4,5]decane, a reaction product of 7,7,9,9-tetramethyl-2-cycloundecyl-1-oxa-3,8-diaza4-oxospiro [4,5]decane und epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxymethylene-malonic acid with 1,2,2,6,6-pentamethyl-4-hydroxypiperidine, poly[methylpropyl-3-oxy-4(2,2,6,6-tetramethyl-4-piperidyl)]siloxane, reaction product of maleic acid anhydride-a-olefin-copolymer with 2,2,6,6-tetramethyl-4-aminopiperidine or 1,2,2,6,6-pentamethyl-4-aminopiperidine.

Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2(2-Hydroxyphenyl)-1,3,5-triazines, for example 2,4,6-tris(2-hydroxy4octyloxyphenyl)-1,3,5-triazine, 2-(2-hydroxy-4-octyloxyphenyl)4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)4-(2,4-dimethylphenyl)-1,3,5-triazine, 2-(2-hydroxy-4-octyloxyphenyl)-4,6-bis-(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy[]tridecyloxyphenyl)-4,6-bis(2,4-dimethylphenyl)-1,3,5-triazine, 2-[2-hydroxy-4(2-hydroxy-3-butyloxy-propoxy)phenyl]-4,6-bis(2,4-dimethyl)-1,3,5-triazine, 2-[2-hydroxy-4(2-hydroxy-3-octyloxy-propyloxy)phenyl]4,6-bis(2,4-dimethyl)-1,3,5-triazine, 2-[4-(dodecyloxy/tridecyloxy-2-hydroxypropoxy)-2-hydroxy-phenyl]4,6-bis(2,4-di-methylphenyl)-1,3,5-triazine, 2-[2-hydroxy-4-(2-hydroxy-3-dodecyloxy-propoxy)phenyl]4,6-bis(2,4-dimethylphenyl)-1,3,5-triazine, 2-(2-hydroxy-4-hexyloxy)phenyl-4,6-diphenyl-1,3,5-triazine, 2-(2-hydroxy4-methoxyphenyl)-4,6-diphenyl-1,3,5-triazine, 2,4,6-tris[2-hydroxy-4(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

A further subject of the present invention is the use of a hindered amine compound of formulas A to R and A* to R* for preventing wood from light induced degradation. Examples and preferences for the substituents have been already mentioned and apply also for the above subject of the invention.

The present invention is particularly useful for the following applications: in house applications, such as furniture, parquet floors, chipboards or timber work; outdoor applications such as fences, construction parts, wooden fronts, window frames and the like.

Other areas are: Waterborne sap stain protectants for the temporary protection of freshly sawn wood parts, waterborne tinting baths for wood veneers, waterborne wood preservative formulations, waterborne formulations for the pressure treatment of wood construction parts and waterborne sealers.

In cases where maximum stabilization is required a complete wood protection system may be applied. The wood protection system comprises an impregnation according to the present invention, optionally an intermediate layer and a final top coat, which may be stabilized as described before.

The following examples illustrate the invention.

EXAMPLE 1

2% of the compounds given in Table 1 are dissolved in water (comparative example in ethanol). The respective solution is brushed on a panel of Ayous Obeche wood. The sample is dried for 2 hours at room temperature. The samples are exposed for three days under six TL 40W/03 fluorescent lamps (Philips) at a distance of 20 cm.

The yellowness index (YI) is measured against a white standard according to ASTM D 1925. The yellowness index of the untreated wood is given in the first row of the table.

TABLE 1

| compound No. | solvent | YI |
|---|---|---|
| — | — | 50.0 |
| 101 | water | 39.3 |
| 101 comparative example | ethanol | 47.0 |

EXAMPLE 2

Inhibition of Yellowing of Fir Panels With an Aqueous N-Oxid-HALS Primer and an Alkyd Top Coat 0,5% of the compounds given in Table 2 are dissolved in water. The solution is brushed as a primer on fir panels. The samples are dried for 2 hours at room temperature and coated afterwards with an alkyd lacquer containing 1,5% Tinuvin 384 and 1,5% Tinuvin 292.

Formulation of top coat:

53,48 parts of an Alkyd Resin (Jägalyd Antihydro®, E. Jäger KG, 60% solution in white spirit)

10,69 parts of a thixotropic agent (Jägalyd Antihydro-Thix®, E. Jäger KG, 50% solution)

1,92 parts of an accelerator (Jäger Antihydro-Trockner®)

33,44 parts of a solvent (Terlitol® 30)

0,32 parts of an antiskinning agent (Ascinin® P, BAYER)

0,15 parts of an antiskinning agent (Luactin® M, BASF)

Comparison 1 is a sample without primer and without stabilizers in the top coat. A sample with top coat and without primer is used as comparison 2.

The color change ΔE (DIN 6174) in comparison to an unexposed sample is measured after 800 hours weathering. The results are given in Table 2.

TABLE 2

| compound No. | ΔE |
|---|---|
| comparison 1 | 21,2 |
| comparison 2 | 13,9 |
| 101 | 8,9 |
| 106 | 11,6 | compound (101)

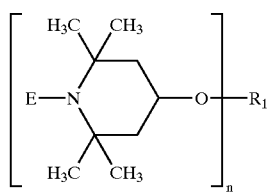

(106)

Tinuvin® 384 is a commercial benzotriazol UV-absorber of Ciba Specialty Chemicals Inc.

Tinuvin® 292 is a commercial sterically hindered amine of Ciba Specialty Chemicals Inc.

What is claimed is:

1. A method of protecting wood against light-induced degradation by treatment of wood with an impregnation which penetrates the surface of the wood, said impregnation comprising a) water without an organic solvent and b) a sterically hindered amine which is selected from the group consisting of compounds of formulae A to R and A* to R*

(A)

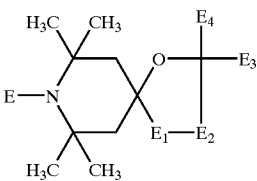

-continued

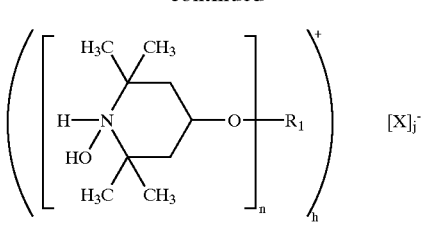 (A*)

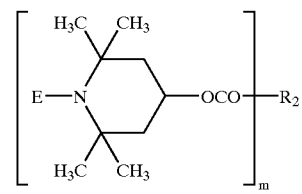 (B)

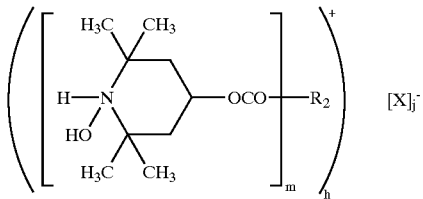 (B*)

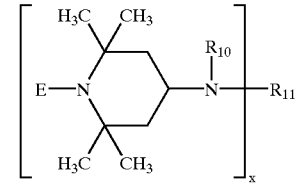 (C)

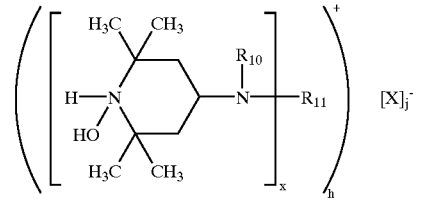 (C*)

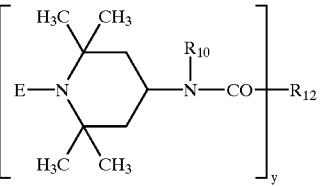 (D)

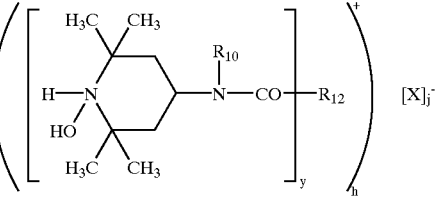 (D*)

(E)

-continued
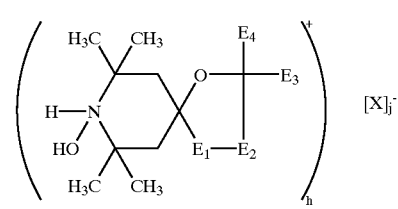 (E*)
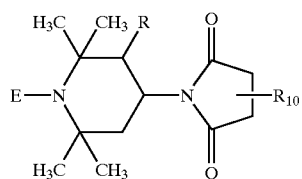 (F)
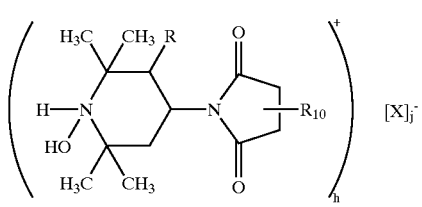 (F*)
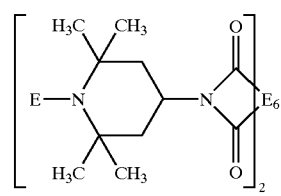 (G)
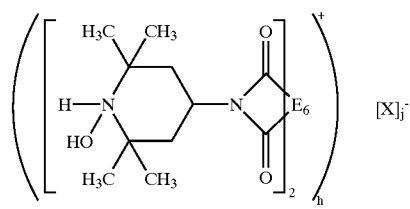 (G*)
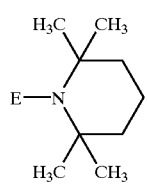 (H)
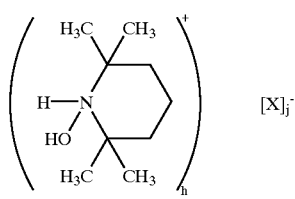 (H*)
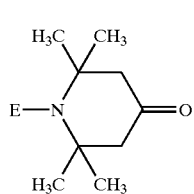 (I)
-continued
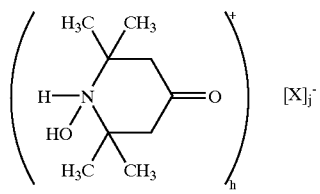 (I*)
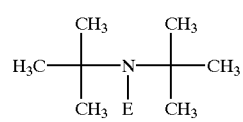 (J)
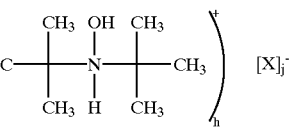 (J*)
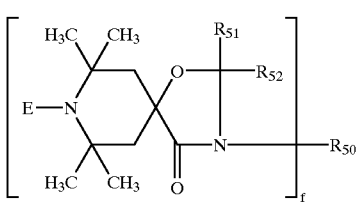 (K)
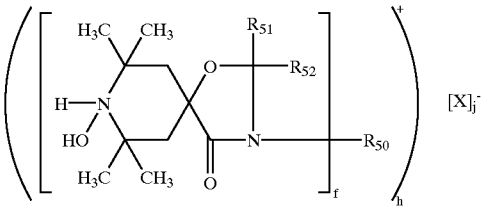 (K*)
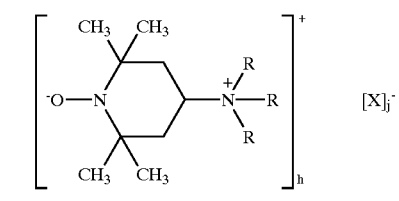 (L)
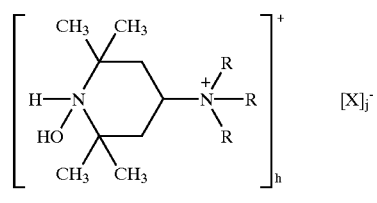 (L*)
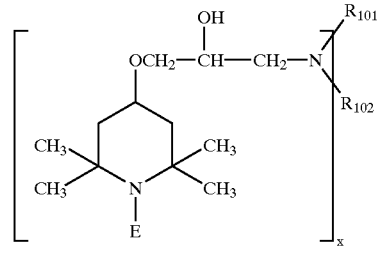 (M)

(M*)

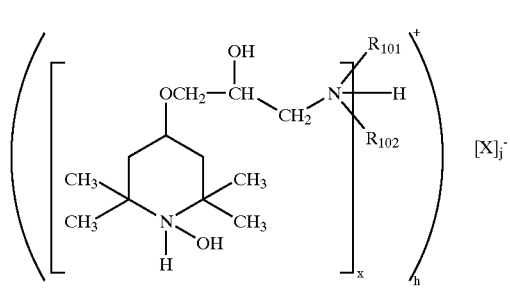

(N)

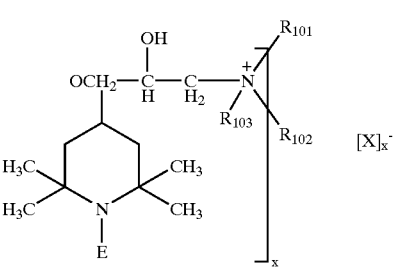

(N*)

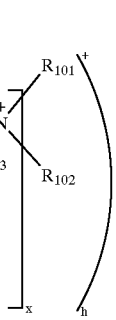

(O)

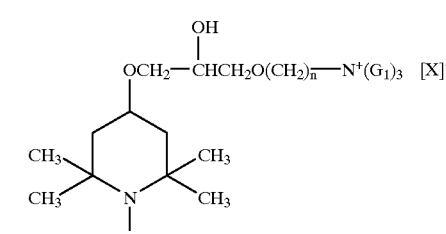

(O*)

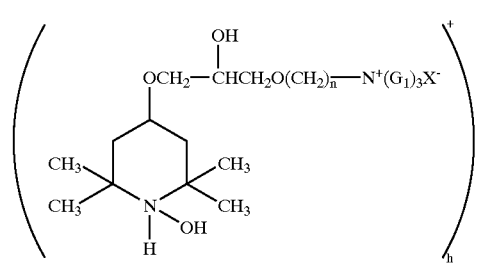

(P)

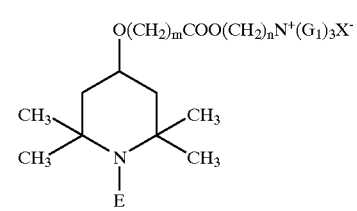

(P*)

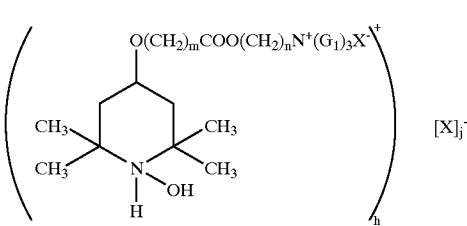

(Q)

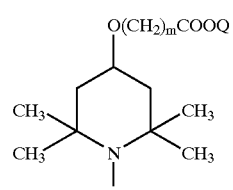

(Q*)

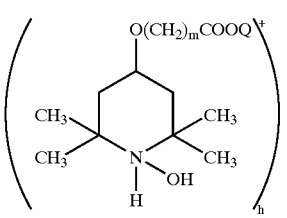

(R)

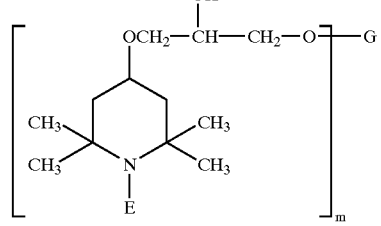

(R*)

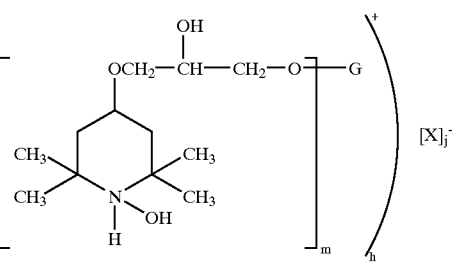

wherein
E is oxyl or hydroxyl,
R is hydrogen or methyl,
in formula A and A*,
n is 1 or 2,
when n is 1,
  $R_1$ is hydrogen, alkyl of 1 to 18 carbon atoms, alkenyl of 2–18 carbon atoms, propargyl, glycidyl, alkyl of 2 to 50 carbon atoms interrupted by one to twenty oxygen atoms, said alkyl substituted by one to ten hydroxyl groups or both interrupted by said oxygen atoms and substituted by said hydroxyl groups, or
  $R_1$ is alkyl of 1 to 4 carbon atoms substituted by a carboxy group or by —COOZ where Z is hydrogen, alkyl of 1 to 4 carbon atoms or phenyl, or where Z is said alkyl substituted by —$(COO^-)_n$ $M^{n+}$ where n is 1–3 and M is a metal ion from the 1st, 2nd or 3rd group of the periodic table or is Zn, Cu, Ni or Co, or M is a group $N^{n+}(R_2)_4$ where $R_2$ is alkyl of 1 to 8 carbon atoms or benzyl, when n is 2, $R_1$ is alkylene of 1 to 12 carbon atoms, alkenylene of 4 to 12 carbon atoms, xylylene or alkylene of 1 to 50 carbon atoms interrupted by one to twenty oxygen atoms, substituted by one to ten hydroxyl groups or both interrupted by said oxygen atoms and substituted by said hydroxyl groups, in formula B and B*, m is 1 to 4, when m is 1, $R_2$ is alkyl of 1 to 18 carbon atoms, alkyl of 3 to 18 carbon atoms interrupted by —COO—, alkyl of 3 to 18 carbon atoms substituted by COOH or COO—, or $R_2$ is —$CH_2(OCH_2CH_2)_nOCH_3$ where n is 1 to 12, or $R_2$ is cycloalkyl of 5 to 12 carbon atoms, aryl of 6 to 12 carbon atoms, or said aryl substituted by one to four alkyl groups of 1 to 4 carbon atoms, or $R_2$ is —$NHR_3$ where $R_3$ is alkyl of 1 to 18 carbon atoms, cycloalkyl of 5 to 12 carbon atoms, aryl of 6 to 12 carbon atoms, or said aryl substituted by one to four alkyl of 1 to 4 carbon atoms, or $R_2$ is —$N(R_3)_2$ where $R_3$ is as defined above, when m is 2, $R_2$ is alkylene of 1 to 12 carbon atoms, alkenylene of 4 to 12 carbon atoms, xylylene, alkylene of 2 to 12 carbon atoms interrupted by —COO—, alkylene of 3 to 18 carbon atoms substituted by COOH or COO—, or $R_2$ is —$CH_2(OCH_2CH_2)_nOCH_2$— where n is 1 to 12, or $R_2$ is cycloalkylene of 5 to 12 carbon atoms, aralkylene of 7 to 15 carbon atoms or arylene of 6 to 12 carbon atoms, or $R_2$ is —$NHR_4NH$— where $R_4$ is alkylene of 2 to 18 carbon atoms, cycloalkylene of 5 to 12 carbon atoms, aralkylene of 8 to 15 carbon atoms or arylene of 6 to 12 carbon atoms, or $R_2$ is —$N(R_3)R_4N(R_3)$— where $R_3$ and $R_4$ are as defined above, or $R_2$ is —CO— or —NH—CO—NH—, when m is 3, $R_2$ is alkanetriyl of 3 to 8 carbon atoms or benzenetriyl, or when m is 4, $R_2$ is alkanetetrayl of 5 to 8 carbon atoms or benzenetetrayl, in formula C and C*, $R_{10}$ is hydrogen, alkyl of 1 to 18 carbon atoms, cycloalkyl of 5 to 12 carbon atoms, aralkyl of 7 to 15 carbon atoms, alkanoyl of 2 to 18 carbon atoms, alkenoyl of 3 to 5 carbon atoms or benzoyl, x is 1 or 2, when x is 1, $R_{11}$ is hydrogen, alkyl of 1 to 18 carbon atoms, alkenyl of 2 to 18 carbon atoms, propargyl, glycidyl, alkyl of 2 to 50 carbon atoms interrupted by one to twenty oxygen atoms, said alkyl substituted by one to ten hydroxyl groups or both interrupted by said oxygen atoms and substituted by said hydroxyl groups, or $R_{11}$ is alkyl of 1 to 4 carbon atoms substituted by a carboxy group or by —COOZ where Z is hydrogen, alkyl of 1 to 4 carbon atoms or phenyl, or where Z is said alkyl substituted by —$(COO^-)_n$ $M^{n+}$ where n is 1–3 and M is a metal ion from the 1st, 2nd or 3rd group of the periodic table or is Zn, Cu, Ni or Co, or M is a group $N^{n+}(R_2)_4$ where $R_2$ is hydrogen, alkyl of 1 to 8 carbon atoms or benzyl, or when x is 2, $R_{11}$ is alkylene of 1 to 12 carbon atoms, alkenylene of 4 to 12 carbon atoms, xylylene or alkylene of 1 to 50 carbon atoms interrupted by one to twenty oxygen atoms, substituted by one to ten hydroxyl groups or both interrupted by said oxygen atoms and substituted by said hydroxyl groups, in formula D and D*, $R_{10}$ is as defined above, y is 1 to 4, and $R_{12}$ is defined as $R_2$ above, in formula E and E*, $E_1$ and $E_2$, being different, each are —CO— or —$N(E_5)$— where $E_5$ is hydrogen, alkyl of 1 to 12 carbon atoms or alkoxycarbonylalkyl of 4 to 22 carbon atoms, $E_3$ is hydrogen, alkyl of 1 to 30 carbon atoms, phenyl, naphthyl, said phenyl or said naphthyl substituted by chlorine or by alkyl of 1 to 4 carbon atoms, or phenylalkyl of 7 to 12 carbon atoms, or said phenylalkyl substituted by alkyl of 1 to 4 carbon atoms, $E_4$ is hydrogen, alkyl of 1 to 30 carbon atoms, phenyl, naphthyl or phenylalkyl of 7 to 12 carbon atoms, or $E_3$ and $E_4$ together are polymethylene of 4 to 17 carbon atoms, or said polymethylene substituted by one to four alkyl of 1 to 4 carbon atoms, preferably methyl, in formula F and F*, $R_{10}$ is as defined for $R_{10}$ in formula C, in formula G and G*, $E_6$ is an aliphtic or aromatic tetravalent radical, preferably neopentanetetrayl or benzenetetrayl, in formula K and K*, $R_{51}$ is hydrogen, alkyl of 1 to 18 carbon atoms, cycloalkyl of 5 to 12 carbon atoms, or aryl of 6 to 10 carbon atoms, $R_{52}$ is hydrogen or alkyl of 1 to 18 carbon atoms, or $R_{51}$ and $R_{52}$ together of alkylene of 4 to 8 carbon atoms, f is 1 or 2, when f is 1, $R_{50}$ is as defined for $R_{11}$ in formula C when x is 1, or $R_{50}$ is —$(CH_2)_zCOOR_{54}$ where z is 1 to 4 and $R_{54}$ is hydrogen or alkyl of 1 to 18 carbon atoms, or $R_{54}$ is a metal ion from the 1st, 2nd or 3rd group of the periodic table or a group —$N(R_{55})_4$ where $R_{55}$ is hydrogen, alkyl of 1 to 12 carbon atoms or benzyl, when f is 2, $R_{50}$ is as defined for $R_{11}$ in formula C when x is 2, wherein in formulas M to Q and M* to Q*

$G_1$ is hydrogen, methyl, ethyl, butyl or benzyl, n is 2 to 3, m is 1 to 4, x is 1 to 4, when x is 1, $R_{101}$ and $R_{102}$ are independently alkyl of 1 to 18 carbon atoms, said alkyl interrupted by one to five oxygen atoms, said alkyl substituted by 1 to 5 hydroxyl groups or said alkyl both interrupted by said oxygen atoms and substituted by said hydroxyl groups; cycloalkyl of 5 to 12 carbon atoms, aralkyl of 7 to 15 carbon atoms, aryl of 6 to 10 carbon atoms or said aryl substituted by one to three alkyl of 1 to 8 carbon atoms, or $R_1$ is also hydrogen, or $R_{101}$ and $R_{102}$ are together tetramethyl, pentamethylene, hexamethylene or 3-oxapentamethylene, when x is 2,
$R_{101}$ is hydrogen, alkyl of 1 to 8 carbon atoms, said alkyl interrupted by one or two oxygen atoms, said alkyl substituted by a hydroxyl group, or said alkyl both interrupted by one or two oxygen atoms and substituted by a hydroxyl group, $R_{102}$ is alkylene of 2 to 18 carbon atoms, said alkylene interrupted by one to five oxygen atoms, said alkylene substituted by 1 to 5 hydroxyl groups or said alkylene both interrupted by said oxygen atoms and substituted by said hydroxyl groups; o-, m- or p-phenylene or said phenylene substituted by one or two alkyl of 1 to 4 carbon atoms, or $R_{102}$ is —$(CH_2)_kO[(CH_2)_kO]_h(CH_2)_k$— where k is 2 to 4 and h is 1 to 40, or $R_{101}$ and $R_{102}$ together with the two N atoms to which they are attached are piperazin-1,4-diyl, when x is 3,
$R_{101}$ is hydrogen,
$R_{102}$ is alkylene of 4 to 8 carbon atoms interrupted by one nitrogen atom, when x is 4,
$R_{101}$ is hydrogen,
$R_{102}$ is alkylene of 6 to 12 carbon atoms interrupted by two nitrogen atoms,
$R_{103}$ is hydrogen, alkyl of 1 to 8 carbon atoms, said alkyl interrupted by one or two oxygen atoms, said alkyl substituted by a hydroxyl group, or both interrupted by one or two oxygen atoms and substituted by a hydroxyl group, and Q is an alkali metal salt, ammonium or $N^+(G_1)_4$, and in formula R and R*
m is 2 or 3,
when m is 2, G is —$(CH_2CHR—O)_rCH_2CHR$—, where r is 0 to 3, and R is hydrogen or methyl, and
when m is 3, G is glyceryl, X is an inorganic or organic anion,
where the total charge of cations h is equal to the total charge of anions j.

2. A method according to claim 1 where in the compound of component (b), X is phosphate, carbonate, bicarbonate, nitrate, chloride, bromide, bisulfite, sulfite, bisulfate, sulfate, borate, carboxylate, citrate, an alkylsulfonate or an arylsulfonate, or a phosphonate.

3. A method according to claim 1 wherein the compound of component (b) is selected from the group consisting of compounds of formulaes A, A*, B, B*, C, C*, D, D*, H, H*, I, I*, L, L*, M, M*, N and N*
where E is oxyl or hydroxyl, and R is hydrogen,
in formula A and A*
n is 1 or 2,
when n is 1,
$R_1$ is hydrogen, alkyl of 1 to 6 carbon atoms, alkenyl of 2–6 carbon atoms, propargyl, glycidyl, alkyl of 2 to 20 carbon atoms interrupted by one to ten oxygen atoms, said alkyl substituted by one to five hydroxyl groups or both interrupted by said oxygen atoms and substituted by said hydroxyl groups, or
$R_1$ is alkyl of 1 to 4 carbon atoms substituted by a carboxy group or by —COOZ where Z is hydrogen or alkyl of 1 to 4 carbon atoms, when n is 2,
$R_1$ is alkylene of 1 to 8 carbon atoms, alkenylene of 4 to 8 carbon atoms, alkylene of 1 to 20 carbon atoms interrupted by one to ten oxygen atoms, substituted by one to five hydroxyl groups or both interrupted by said oxygen atoms and substituted by said hydroxyl groups, in formula B and B*
m is 1 or 2
when m is 1,
$R_2$ is alkyl of 1 to 4 carbon atoms or $R_2$ is $CH_2(OCH_2CH_2)_nOCH_3$ where n is 1 to 12, or
$R_2$ is phenyl, or said phenyl substituted by one to or three methyl groups,
$R_2$ is —$NHR_3$ where $R_3$ is alkyl of 1 to 4 carbon atoms or phenyl, or said phenyl substituted by one or two methyl groups, when m is 2,
$R_2$ is alkylene of 1 to 8 carbon atoms, alkenylene of 4 to 8 carbon atoms, or $R_2$ is —$CH_2(OCH_2CH_2)_nOCH_2$— where n is 1 to 12 or,
$R_2$ is —$NHR_4NH$— where $R_4$ is alkylene of 2 to 6 carbon atoms, aralkylene of 8 to 15 carbon atoms or arylene of 6 to 12 carbon atoms or,
$R_2$ is —CO— or —NHCONH, in formula C and C*,
$R_{10}$ is hydrogen or, alkanoyl of 1 to 3 carbon atoms,
x is 1 or 2,
when x is 1,
$R_{11}$ is hydrogen, alkyl of 1 to 6 carbon atoms or glycidyl or,
$R_{11}$ is alkyl of 1 to 4 carbon atoms substituted by a carboxy group or by COOZ where Z is hydrogen or alkyl of 1 to 4 carbon atoms, when x is 2,
$R_{11}$ is alkylene of 1 to 6 carbon atoms, in formula D and D*,
$R_{10}$ is hydrogen,
y is 1 or 2,
$R_{12}$ is defined as $R_2$ above, in formula M, M*, N and N*,
x is 1 or 2,
when x is 1,
$R_{101}$ and $R_{102}$ are independently alkyl of 1 to 4 carbon atoms,
or $R_{101}$ and $R_{102}$ are together tetramethylene, or pentamethylene,
$R_{102}$ is hydrogen or alkyl of 1 to 4 carbon atoms, said alkyl group substituted by a hydroxyl group, when x is 2,
$R_{101}$ is hydrogen, alkyl of 1 to 4 carbon atoms, said alkyl substituted by a hydroxyl group,
$R_{102}$ is alkylene of 2 to 6 carbon atoms,
$R_{103}$ is as defined above.

4. A method according to claim 3 wherein the compound of component (b) is selected from the group consisting of compounds of formulaes A, A*, B, B*, C, C* and D, D*
where E is oxyl or hydroxyl,
R is hydrogen,
in formula A and A*,
n is 1,
$R_1$ is hydrogen, alkyl of 1 to 4 carbon atoms, glycidyl, alkyl of 2 to 4 carbon atoms interrupted by one or two oxygen atoms, said alkyl substituted by one or two hydroxyl groups or both interrupted by said oxygen atoms and substituted by said hydroxyl groups, or R₁ is alkyl of 1 to 4 carbon atoms substituted by —COOZ where Z is hydrogen or alkyl of 1 to 4 carbon atoms,
in formula B and B*,
m is 1 or 2,
R₂ is alkyl of 1 to 4 carbon atoms or R₂ is CH₂(OCH₂CH₂)ₙOCH₃ where n is 1 to 4,
when m is 2,
R is alkylene of 1 to 8 carbon atoms,
in formula C and C*,
R₁₀ is hydrogen or alkanoyl of 1 or 2 carbon atoms,
x is 1 or 2,
when x is 1,
R₁₁ is hydrogen, alkyl of 1 to 4 carbon atoms or glycidyl,
R₁₁ is alkyl of 1 to 4 carbon atoms substituted by COOZ where Z is hydrogen or alkyl of 1 to 4 carbon atoms,
when x is 2,
R₁₁ is alkylene of 1 to 6 carbon atoms,
in formula D and D*,
R₁₀ is hydrogen,
y is 1 or 2,
R₁₂ is defined as R₂ above.

5. A method according to claim 1 wherein the compound of component (b) is
(a) bis(1-hydroxy-2,2-6-6-tetramethylpiperidin-4-yl) sebacate;
(b) 1-hydroxy-2,2-6-6-tetramethyl-4-acetoxypiperidinium citrate;
(c) 1-oxyl-2,2,6,6-tetramethyl-4-acetamidopiperidine;
(d) 1-hydroxy-2,2,6,6-tetramethyl-4-acetamidopiperidine;
(e) 1-hydroxy-2,2,6,6-tetramethyl-4-acetamidopiperidinium bisulfate;
(f) 1-oxyl-2,2,6,6-tetramethyl-4-oxo-piperidine;
(g) 1-hydroxy-2,2,6,6-tetramethyl-4-oxo-piperidine;
(h) 1-hydroxy-2,2,6,6-tetramethyl-4-oxo-piperidinium acetate;
(i) 1-oxyl-2,2,6,6-tetramethyl-4-methoxy-piperidine;
(j) 1-hydroxy-2,2,6,6-tetramethyl-4-methoxy-piperidine;
(k) 1-hydroxyl-2,2,6,6-tetramethyl-4-methoxy-piperidinium acetate;
(l) 1-oxyl-2,2,6,6-tetramethyl-4-acetoxypiperidine;
(m) 1-hydroxy-2,2,6,6-tetramethyl-4-acetoxypiperidine;
(n) 1-oxyl-2,2,6,6-tetramethyl-4-propoxy-piperidine;
(o) 1-hydroxy-2,2,6,6-tetramethyl-4-propoxy-piperidinium acetate;
(p) 1-hydroxy-2,2,6,6-tetramethyl-4-propoxy-piperidine;
(q) 1-oxyl-2,2,6,6-tetramethyl-4-(2-hydroxy-4-oxapentoxy)piperidine;
(r) 1-hydroxy-2,2,6,6-tetramethyl-4-(2-hydroxy-4-oxapentoxy)piperidinium acetate;
(s) 1-oxyl-2,2,6,6-tetramethyl-4-hydroxypiperidine;
(t) 1-hydroxy-2,2,6,6-tetramethyl-4-hydroxypiperidine;
(u) 1-hydroxy-2,2,6,6-tetramethyl-4-hydroxypiperidinium chloride;
(v) 1-hydroxy-2,2,6,6-tetramethyl-4-hydroxypiperidinium acetate;
(w) 1-hydroxy-2,2,6,6-tetramethyl-4-hydroxypiperidinium bisulfate;
(x) 1-hydroxy-2,2,6,6-tetramethyl-4-hydroxypiperidinium citrate;
(y) bis(1-hydroxy-2,2,6,6-tetramethyl-4-hydroxypiperidinium)citrate;
(z) tris(1-hydroxy-2,2,6,6-tetramethyl-4-hydroxypiperidinium)citrate;
(bb) tetra(1-hydroxy-2,2,6,6-tetramethyl-4-hydroxypiperidinium)ethylenediaminetetraacetate;
(cc) tetra(1-hydroxy-2,2,6,6-tetramethyl-4-acetamidopiperidinium)ethylenediaminetetraacetate;
(dd) tetra(1-hydroxy-2,2,6,6-tetramethyl-4-oxopiperidinium)ethylenediaminetetraacetate;
(ee) penta(1-hydroxy-2,2,6,6-tetramethyl-4-hydroxypiperidinium) diethylenetriaminepentaacetate;
(ff) penta(1-hydroxy-2,2,6,6-tetramethyl-4-acetamidopiperidinium) diethylenetriaminepentaacetate;
(gg) penta(1-hydroxy-2,2,6,6-tetramethyl-4-oxopiperidinium) diethylenetriaminepentaacetate;
(hh) tri(1-hydroxy-2,2,6,6-tetramethyl-4-hydroxypiperidinium)nitrilotriacetate;
(ii) tri(1-hydroxy-2,2,6,6-tetramethyl-4-acetamidopiperidinium)nitrilotriacetate;
(jj) tri(1-hydroxy-2,2,6,6-tetramethyl-4-oxopiperidinium) nitrilotriacetate;
(kk) penta(1-hydroxy-2,2,6,6-tetramethyl-4-hydroxypiperidinium) diethylenetriaminepentamethylenephosphonate;
(ll) penta(1-hydroxy-2,2,6,6-tetramethyl-4-acetamidopiperidinium) diethylenetriaminepentamethylenephosphonate; or
(mm) penta(1-hydroxy-2,2,6,6-tetramethyl-4-oxopiperidinium) diethylenetriaminepentamethylenephosphonate.

6. A method according to claim 5 wherein the compound of component (b) is
(a) 1-oxyl-2,2,6,6-tetramethyl-4-hydroxypiperidine;
(b) 1-hydroxy-2,2,6,6-tetramethyl-4-hydroxypiperidine;
(c) 1-hydroxy-2,2-6-6-tetramethyl-4-acetoxypiperidinium citrate;
(d) 1-hydroxy-2,2,6,6-tetramethyl-4-hydroxypiperidinium citrate;
(e) bis(1-hydroxy-2,2,6,6-tetramethyl-4-hydroxypiperidinium)citrate; or
(f) tris(1-hydroxy-2,2,6,6-tetramethyl-4-hydroxypiperidinium)citrate.

7. A method according to claim 1 wherein the impregnation contains additionally a polymeric binder material.

8. A method according to claim 1 wherein the hindered amine compound b) is present in an amount of 0.1–10% by weight based on the weight of component a).

9. A method according to claim 7, wherein the binder is selected from the group consisting of alkyd resins, modified alkyd resins, autocrosslinking or non-autocrosslinking acrylic resins, polyester resins, drying oils, phenolic resins, nitrocellulose and mixtures thereof.

10. A method according to claim 7, wherein the binder is present in an amount of 1–20% by weight based on the weight of component a).

11. A method according to claim 1 where the impregnation further comprises a sterically hindered phenol, a phosphite or phosphonite or mixtures thereof.

12. A method according to claim 1 where a top coat is applied to the wood.

* * * * *